July 12, 1938. R. FARIES 2,123,505
MOTOR TRUCK
Filed July 29, 1936 10 Sheets-Sheet 1

FIG. I.

WITNESSES:
Hubert Fuchs
William Bell, Jr.

INVENTOR:
Robert Faries,
BY Fraley & Paul
ATTORNEYS.

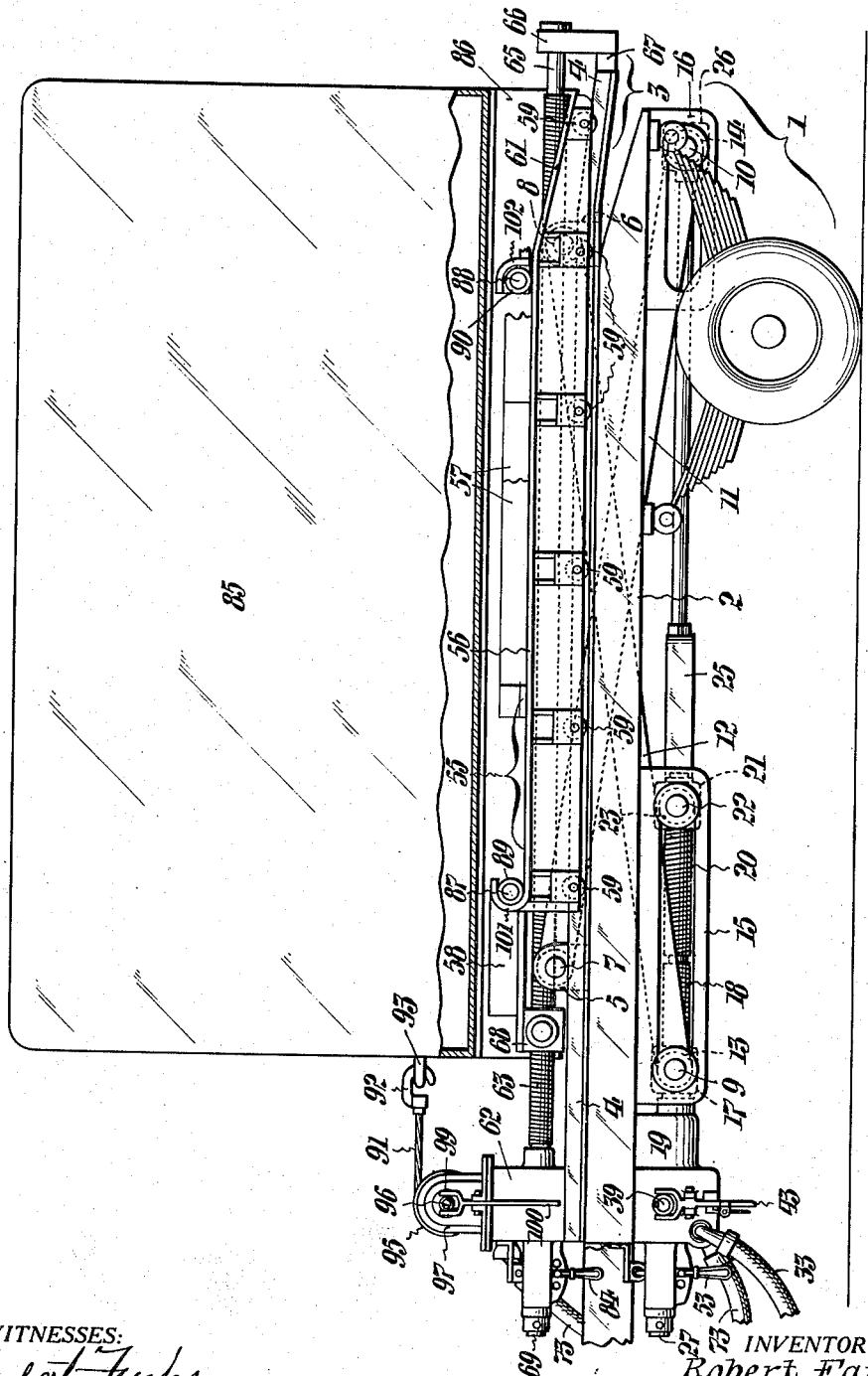

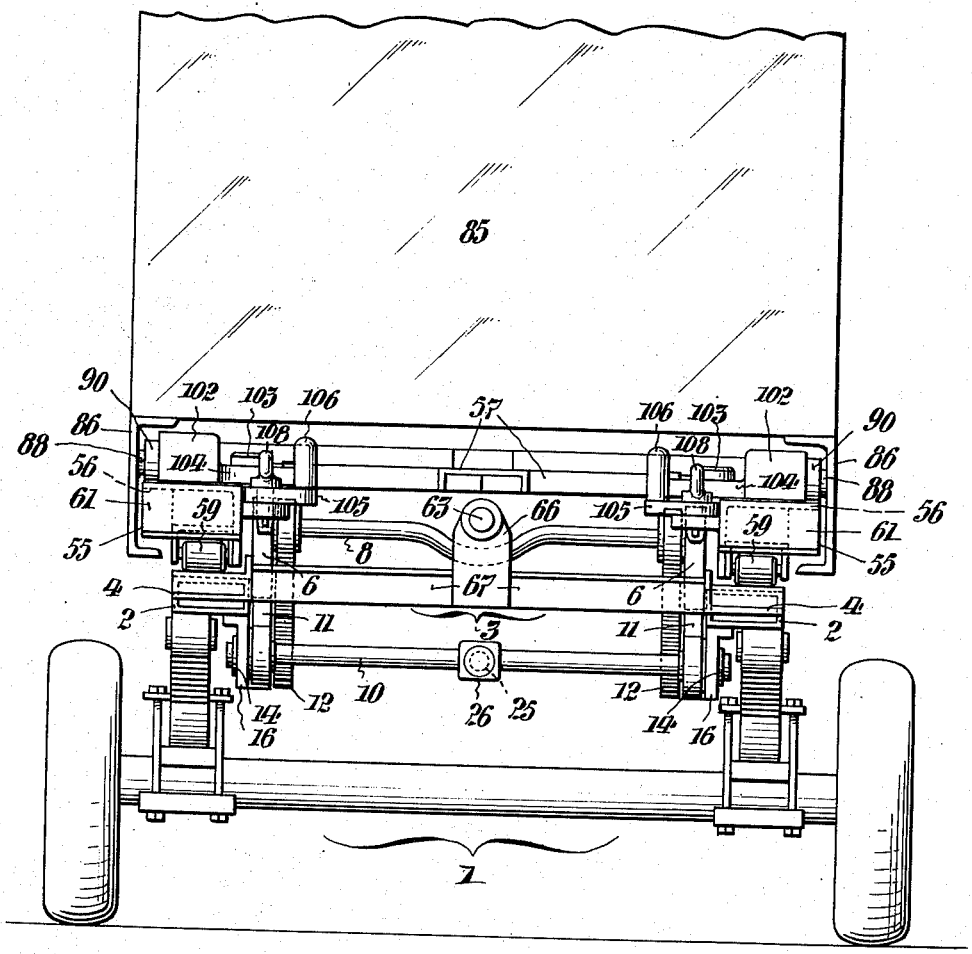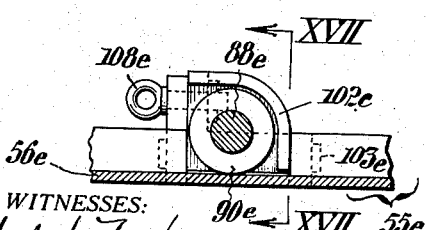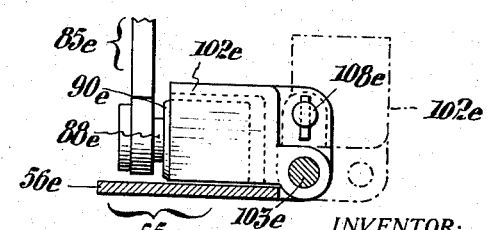

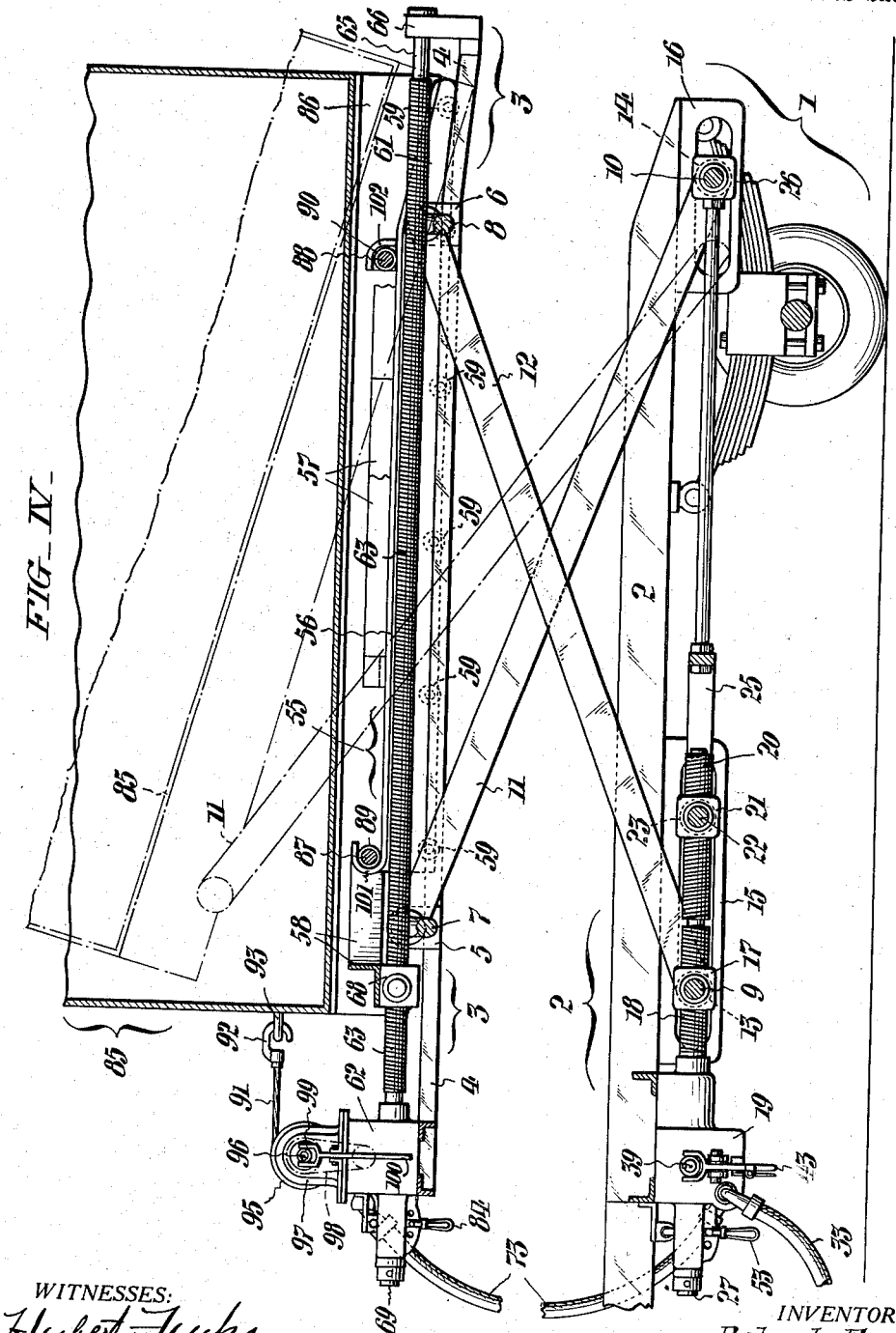

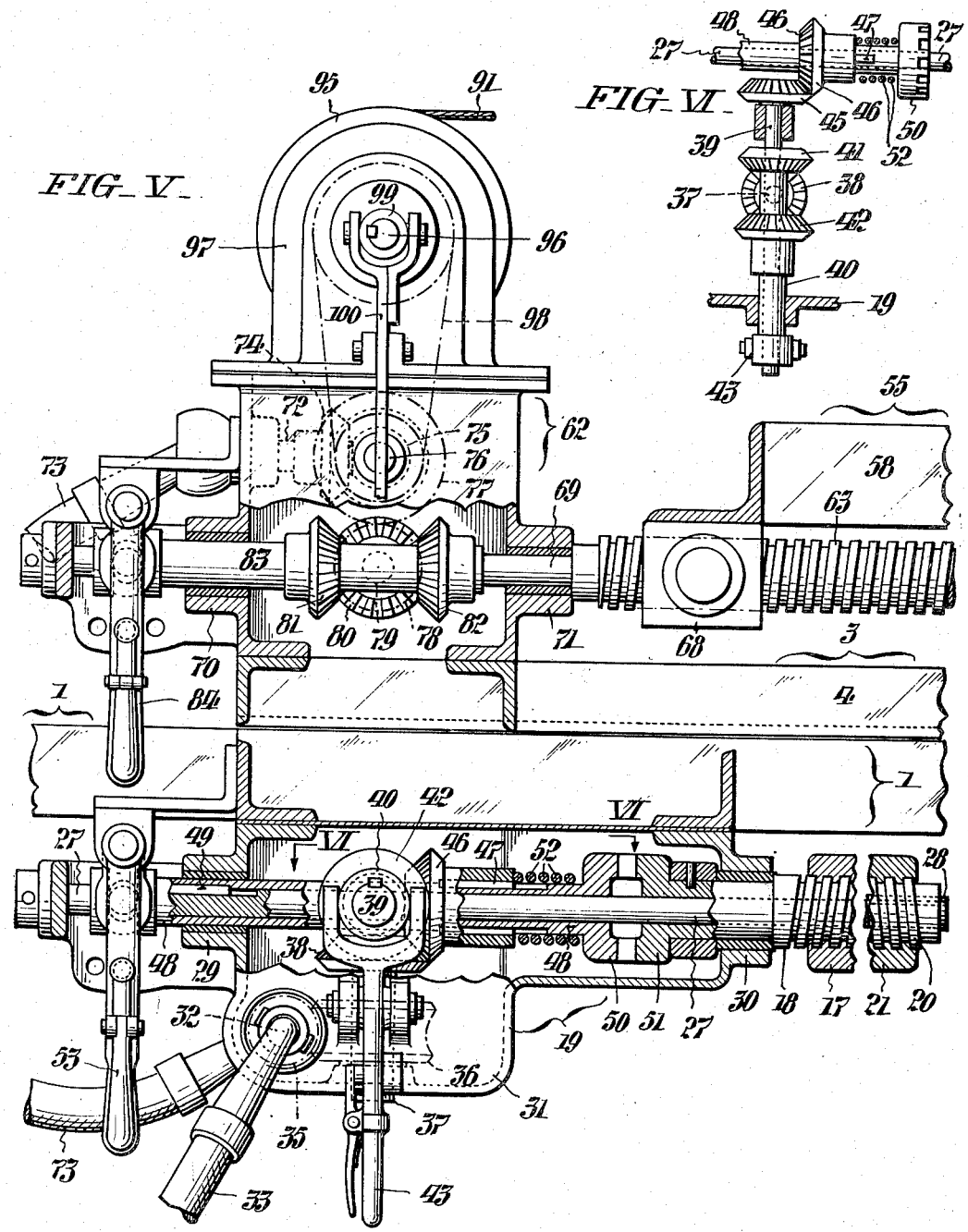

July 12, 1938.  R. FARIES  2,123,505
MOTOR TRUCK
Filed July 29, 1936  10 Sheets-Sheet 6
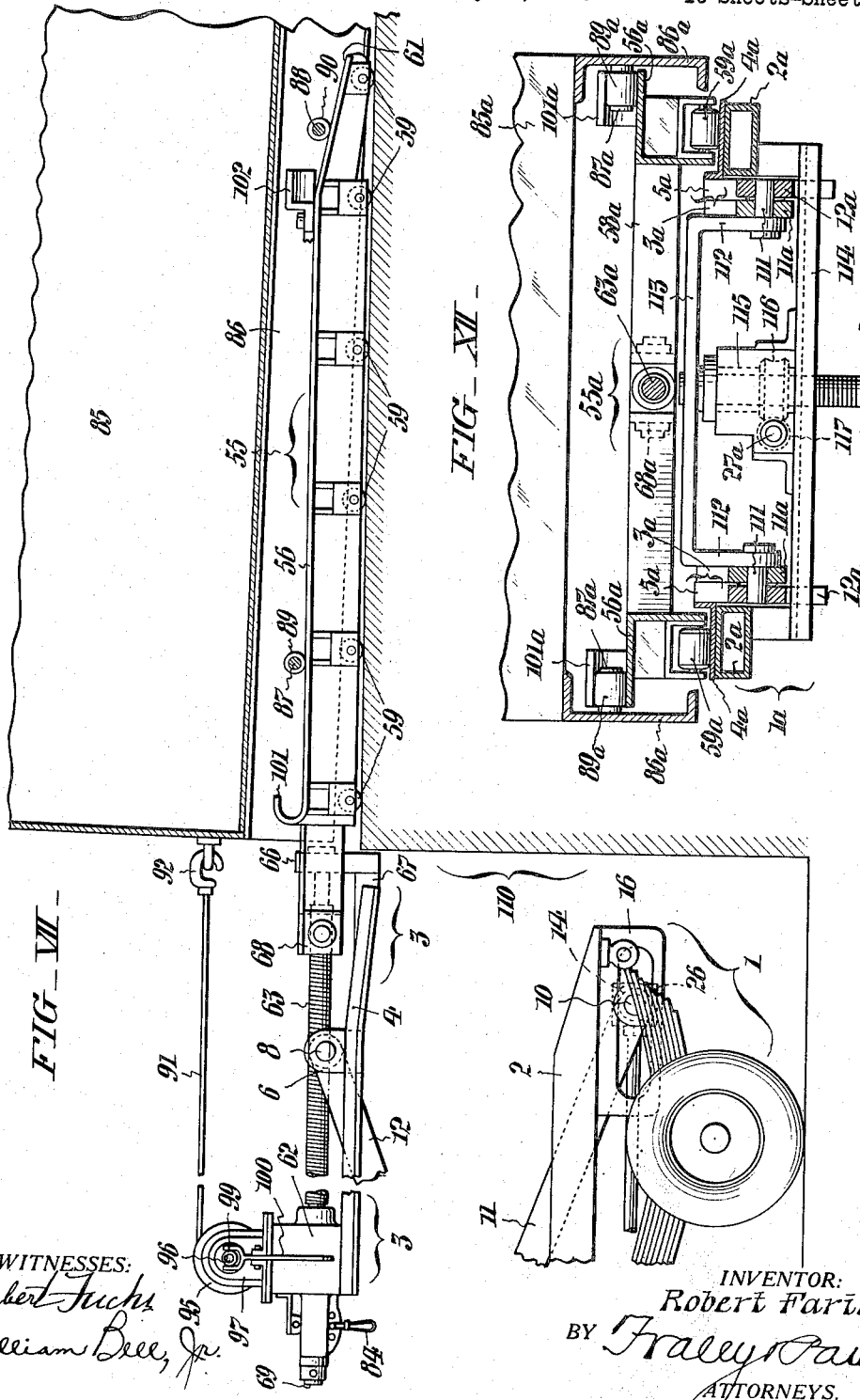
INVENTOR:
Robert Faries,
BY Fraley Paul
ATTORNEYS.

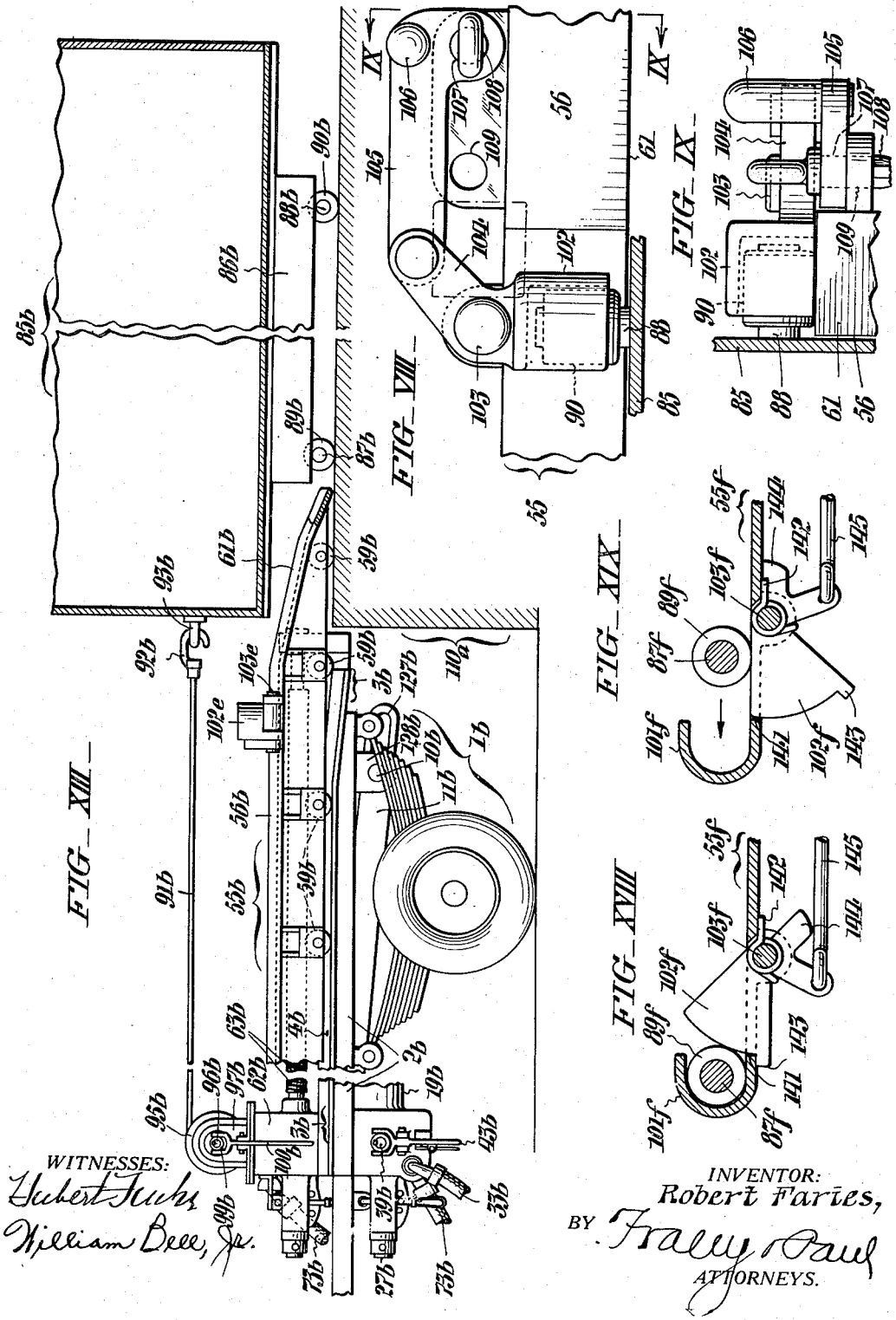

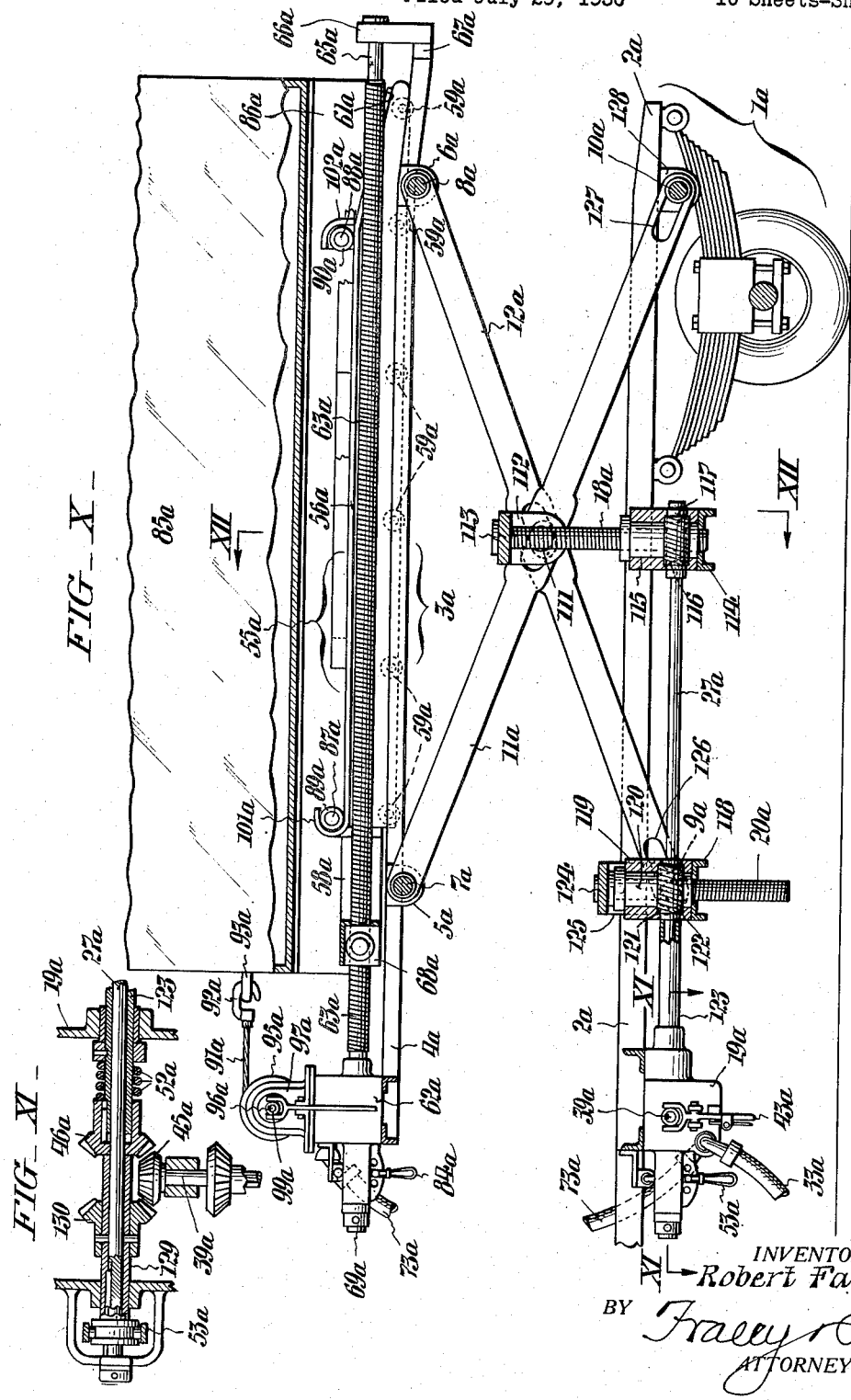

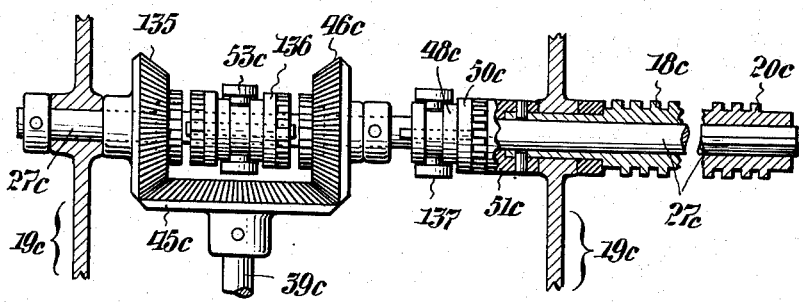
FIG_ XIV_
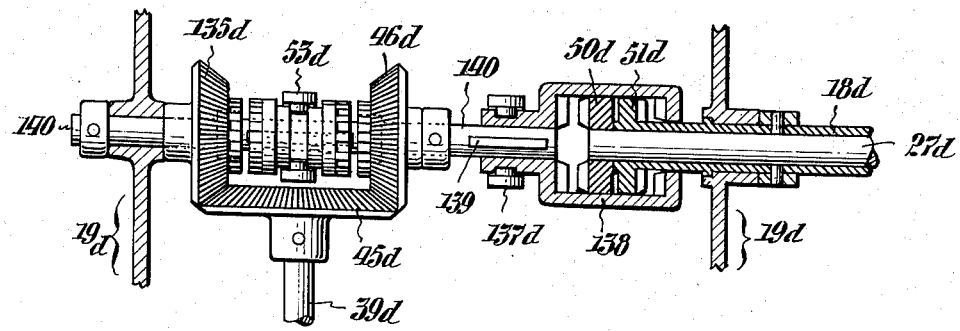
FIG_ XV_

July 12, 1938.  R. FARIES  2,123,505
MOTOR TRUCK
Filed July 29, 1936   10 Sheets-Sheet 10
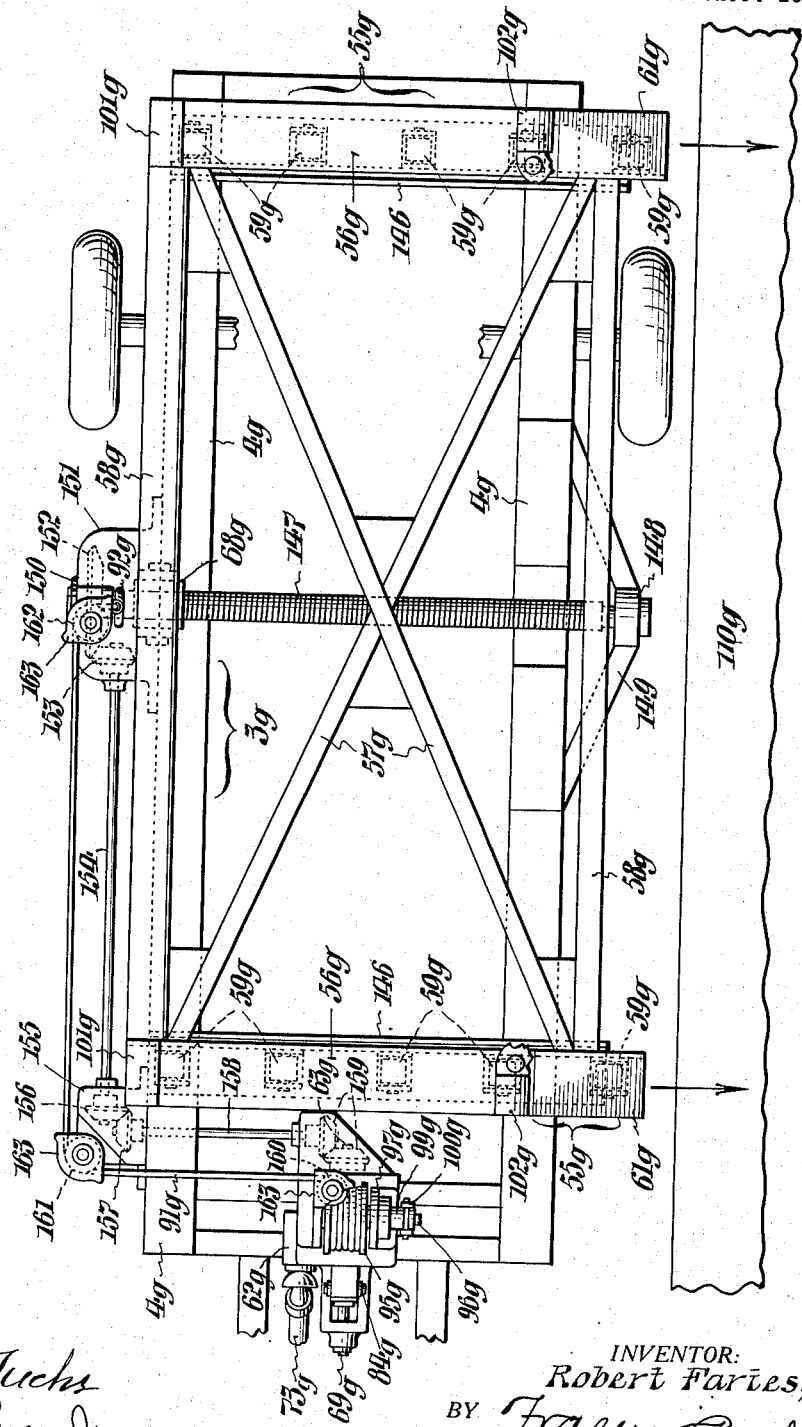
WITNESSES:
INVENTOR:
Robert Faries,
BY
ATTORNEYS.

Patented July 12, 1938

2,123,505

UNITED STATES PATENT OFFICE 2,123,505

MOTOR TRUCK

Robert Faries, St. Davids, Pa.

Application July 29, 1936, Serial No. 93,185

12 Claims. (Cl. 214—65)

This invention relates to motor trucks; and it is more especially concerned with motor trucks designed for the transport of less-than-carload-lot containers, such as are extensively used at the present time for freight shipments by railroad companies.

These shipping containers are heavy and unwieldy, and therefore difficult to handle in moving them from railway station platforms or cars onto or off trucks and in discharging them from the trucks at delivery designations, and vice versa.

My invention is directed, in the main, toward obviating the necessity for manual exertion in the manipulation of shipping containers of the kind referred to. This desideratum, I attain as hereinafter more fully explained, through provision in connection with a motor truck, of a supplemental frame capable of being elevated to the level of the loading platform or of being tilted for dumping; of a carriage with a ramp or wedge end capable of being shifted along the supplemental frame and onto the loading platform and forced beneath the shipping container which is to be hauled; of means for drawing the container into its final position on the carriage; and means deriving power from the truck motor for effecting the elevation and tilting of the supplemental frame, for operating the carriage, and for actuating the draft means from the truck motor.

Other objects and attendant advantages will appear from the following detailed description of the attached drawings; wherein Fig. I shows in plan the rear portion of a motor truck conveniently embodying my invention in one form.

Fig. II showing the truck in longitudinal section with the supplemental frame and the carriage in their normal positions, and with a shipping container in place on the carriage ready for hauling.

Fig. III shows the rear view of the truck.

Fig. IV is a view corresponding to Fig. II showing the supplemental frame in elevated position.

Fig. V is a fragmentary view on a larger scale, partly in longitudinal section and partly in elevation, showing the mechanism for raising and lowering the supplemental frame, for shifting the carriage on the supplemental frame and for drawing the shipping container onto the carriage.

Fig. VI is a fragmentary detail plan sectional view taken as indicated by the arrows VI—VI in Fig. V, and drawn to a smaller scale.

Fig. VII is a fragmentary view, partly in side elevation and partly in longitudinal section, showing how the carriage is moved onto the loading platform and the shipping container run onto the carriage.

Fig. VIII is a fragmentary view in plan showing one type of lock means for holding the container against displacement on the carriage during its transportation.

Fig. IX is a fragmentary detail sectional view taken as indicated by the arrows IX—IX in Fig. VIII.

Fig. X is a view corresponding to Fig. IV showing a modified embodiment of my invention.

Fig. XI is a detail sectional view taken as indicated by the arrows XI—XI in Fig. X.

Fig. XII is a fragmentary detail cross-sectional view taken as indicated by the arrows XII—XII in Fig. X.

Fig. XIII is a view corresponding to Fig. VII showing another modified form of my invention.

Fig. XIV is a detail sectional view corresponding to Fig. VI showing a substitutable modified form of mechanism for raising and lowering the supplemental frame.

Fig. XV is a view like Fig. XIV of a modified form of raising and lowering mechanism which can be substituted for that shown in Fig. XI.

Fig. XVI is a fragmentary detail sectional view of an alternative form of detaining means for the container.

Fig. XVII is a detail section view taken as indicated by the arrows XVII—XVII in Fig. XVI.

Fig. XVIII shows another alternative form of detaining means.

Fig. XIX shows the detaining means of Fig. XVIII in retracted position; and,

Fig. XX is a plan view somewhat similar to Fig. I, but illustrating the adaptation of this invention for sidewise or lateral movement of the carriage and container, relative to the longitudinal dimension of the motor truck.

With more detailed reference first to the embodiment of my invention illustrated in Figs. I–IX, the numeral 1 comprehensively designates the wheeled chassis of a motor truck of which only the rear portion is shown. Normally resting upon the frame 2 of the chassis 1 as in Fig. I, is a supplemental horizontal frame 3 whereof the laterally spaced side longitudinals 4 have upstanding ears 5, 6 near opposite ends connected by transverse rods 7, 8. Disposed at each side of the truck and extending longitudinally of the latter between the rods 7, 8 and similar rods 9, 10 on the chassis 1, is a crossed pair of "lazy tong" bars 11, 12, said rods 9, 10 having rollers 13, 14 at opposite ends engaged in horizontally slotted pendant guides 15, 16 on the chassis frame 2. Centrally of the transverse rod 9 is a nut block 17 which engages a left-hand horizontal screw spindle 18 extending rearwardly from a transmission housing 19 on the chassis 1. An axially-aligned, correspondingly-pitched right-hand screw spindle 20 is similarly engaged by a nut block 21 centrally of another transverse rod 22 with rollers 23 at opposite ends thereof confined to movement in the slots of the guides 15 which serve the rollers 17 on the transverse bar 9. By means of a horizontal yoke rod 25, a block 26 centrally of the transverse bar 10 is coupled with the transverse rod 22. By virtue of this arrangement, rotation of the two screw spindles 18, 20 concurrently in one direction will obviously result in elevation of the supplemental frame 3 as shown in Fig. IV; while concurrent rotation of said spindles in the opposite direction will result in lowering of said frame to its normal position as shown in Fig. II. Again, by using the screw spindle 20 alone, it is possible to tilt the supplemental frame 3 for dumping as exemplified in dot-and-dash lines in Fig. IV.

From Fig. V, it will be observed that the screw spindle 18 is in the form of a sleeve which is free on a shaft 27 whereto the screw spindle 20 is fixed by a key 28, said shaft extending continuously through the transmission housing 19 and being journalled in bearings 29, 30 in the end walls of said housing. In the lower part 31 of the housing 19 is a cross shaft 32 arranged to be driven, through the medium of a flexible shaft 33, from the motor (not illustrated) of the truck. A worm 35 on the shaft 32 within the housing 19 meshes with the worm wheel 36 on a vertical shaft 37 to the top end of which is secured a miter gear 38. In the horizontal plane of the shaft 27 but to one side thereof within the housing 19 is a transverse shaft 39, see Figs. V, VI, whereto is splined a sleeve 40 carrying a pair of opposed miter gears 41, 42, which, upon shifting of the sleeve inward or outward by means of a latch control handle 43, can be selectively meshed with the driving miter gear 38 on the vertical shaft 37. To the inner end of the shaft 39 (Fig. VI) is affixed another miter pinion 45 with which normally meshes a miter pinion 46 splined at 47 to the left hand end of a sleeve 48, which latter is in turn splined at 49 to the portion of the shaft 27 within the housing 19, see Fig. V. At the opposite end, the sleeve 48 is formed with a toothed clutch head 50 adapted for engagement with an opposing toothed clutch head 51 on the plain end of the screw spindle 18 within the housing 19. A helical spring 52 interposed between the miter pinion 46 and the clutch head 50 on the sleeve 48 serves to normally maintain said head yieldingly in engagement with the companion clutch head 51 on the screw spindle 18. By means of a latch control handle 53, the sleeve 48 can be shifted leftward from position shown in Fig. V to disengage the clutch.

When it is desired to elevate the supplemental frame 3, the latch handle 43 is swung to shift the sleeve 40 in one direction to mesh the miter pinion 41 with the pinion 38 on the vertical shaft 37; and when said frame is to be lowered, the handle 43 is swung opposite to reversely shift the sleeve 40 and thereby mesh the miter pinion 42 into mesh with the pinion 38. When the screw spindle 20 is to be used alone to tilt the supplemental frame 3, the handle 53 is swung leftward in Fig. V to correspondingly shift the sleeve 48 in opposition to the spring 52 and thereby disengage the clutch members 50 and 51 whereby the screw spindle 18 is freed from the shaft 27.

Supported on the supplemental frame 3 is a carriage 55 with laterally spaced side rails 56 which are joined intermediate their ends by crossed diagonal braces 57, and at their forward ends by an angular cross member 58. As shown in Figs. I and II the side rails 56 of the carriage 55 are provided with rollers 59 which run on the tracks formed by the side rails 4 of the supplemental frame 3.

For a purpose later on explained, the side longitudinals 56 of the carriage 55 are formed at their rear ends with inclined approaches or ramps as shown at 61. Supported at the forward end of the supplemental frame 3 directly above the transmission housing 19 is an auxiliary transmission housing 62 from which extends rearwardly, a horizontal screw spindle 63. The remote end of this spindle 63 is plain cylindric as shown at 65 and journalled in a central bearing 66 on a cross member 67 connecting the side rails 4 of the supplemental frame 3 at the rear end of the truck. The cross member 58 at the front end of the carriage 55 is pivotally connected to a nut block 68 which engages the screw spindle 63, so that rotation of said spindle in one direction or the other will cause shifting of the carriage 55 forwardly or rearwardly on the supplemental frame 3 with the additional capacity for up and down movement about its pivotal connection with said nut block. The plain cylindric front end 69 of the spindle 63 extends continuously through the auxiliary transmission housing 62, and is journalled in bearings 70, 71 provided by the end walls of said housing. Also journalled in the housing 62 above the plain portion 69 of the screw spindle 63 is a short shaft 72, which, through a flexible shaft 73, is coupled with the shaft 32 of the transmission 19. At its inner end, the shaft 72 carries a pivotal gear pinion 74 which meshes with a bevel gear 75 on a transverse shaft 76 within the housing 62. By means of a pair of intermeshing spur gears 77, 78, rotary motion is imparted from the shaft 76 to another transverse shaft 79 within the housing 62, the latter shaft lying in the horizontal plane of the screw spindle 63. As shown, the shaft 79 carries a miter pinion 80, and selectively engageable with said pinion are opposed miter pinions 81, 82 which are affixed to a splined sleeve 83. This sleeve 83 is axially shiftable on the plane portion 69 of the screw spindle 63 by means of a latch control handle 84. When the handle 84 is swung rightward from the neutral position illustrated in Fig. V to mesh the miter pinion 81 with the driving pinion 80, the carriage 55 will be moved rightward in Fig. II under propulsion of the screw spindle 63. On the other hand, shifting of the handle 84 leftward will cause meshing of the miter pinion 82 with the driving pinion 80 to reversely rotate the screw spindle 63 and return the carriage 55 to its normal position on the supplemental frame 3.

The shipping container for the hauling and transport of which the above described form of truck is designed, is generally designated by the numeral 85 in Figs. II and III, the same having longitudinal channel section sill rails 86 with inwardly projecting axle studs 87, 88 for rollers 89, 90 respectively. For the purpose of drawing the container 85 into its final position on the carriage 55, there is provided a cable 91 with a hook 92 (Figs. I, II, and V) capable of engagement with an eye or bale 93 at the front end of said container. A winding drum or winch 95 for the cable 91 is normally free on a shaft 96 which is journalled in bearing standards 97 at the top of the auxiliary transmission housing 62. The shaft 96 is driven by a sprocket chain connection 98 from the shaft 76 associated with the auxiliary transmission 62; and a clutch 99 controllable by a hand lever 100 is provided whereby the drum 95 can be connected or disconnected from said shaft.

The position of the container 85 on the carriage 55 is determined by engagement of the rollers 89 at the left hand end thereof in upwardly-curved, rearwardly-open stops 101 on the carriage frame. Shifting of the container 85 on the carriage 55 during transport is prevented by engagement of the rollers 90 with upwardly-curved forwardly open stops 102 which may be of the construction illustrated in Figs. VIII and IX. Each such stop 102 is pivotally connected at 103 to the corresponding side longitudinal of the carriage 55 so that it can be swung aside horizontally to the position shown in dot-and-dash lines in Fig. VIII to permit the rollers 89, 90 to pass incident to running the container 85 onto or off said carriage. Integrally formed with the stop 102 is an arm 104 to the end of which is pivoted a link 105 having a manipulating handle 106 and an aperture 107 at its free end. A pin 108 passable through the aperture 107 and selectively engageable with spaced holes 109 in a fixed lug on the carriage 55 is relied upon to lock the stop 102 in active or inactive position.

The manner of using the truck of my invention is illustrated in Fig. VII where 110 indicates any convenient loading platform, and toward which the truck is backed as shown, whereupon the supplemental frame 3 raised to the level of said platform by concurrent rotation of the screw spindles 18 and 20 under control of the latch handle 43 as already understood. After this is accomplished, the cable 91 is attached to the container 85 on the platform 105 to hold said container as the roller carriage 55 is run beneath it by rotation of the screw spindle 63 also as already understood. As the carriage 55 advances, the ramp ends 61 of its side rails 56 first engage beneath the rollers 89 at the front end of the container 85 and later beneath the rollers 90 at the rear end of the latter. The drum or winch 95 is next operated to wind up the cable 91 and the container 85 pulled forward on the carriage 55 until the front rollers 89 are engaged within the stops 101, whereupon the stops 102 are swung over the rear rollers 90 to secure said container in position. Finally, the carriage 55 is drawn back onto the supplemental frame 3 and the latter lowered to the normal position shown in Fig. II. In transposing a container from the truck to the platform 110, the operation is reversed, but the cable 91 is not used, the container 85 being pushed off the carriage 55 to the extent shown in Fig. VII, whereupon said carriage is withdrawn by reverse actuation of the screw spindle 63. In instances where it is more practical to dump the container 85 from the truck 1, this may be accomplished by first raising the supplemental frame 3 and then tilting it to the position shown in dot-and-dash lines in Fig. IV in the way hereinbefore explained.

In the alternative embodiment of my invention illustrated in Figs. X-XII, the bars 11a, 12a of the lifting mechanism are slotted at the points of intersection and there connected by pivot pins 111 fixed within pendant ears 112 of the cross bar 113, which is supported at the middle by the upper end of a vertical screw spindle 18a. Journaled for rotation centrally of a transverse member 114 of the chassis frame 1a is a nut sleeve 115 which engages the screw spindle 18a and which is formed with a worm wheel 116. A driving worm 117 meshing with the worm wheel 116 is secured to the end of a shaft 27a extending rearward from a transmission housing 19a. Forward of the transverse member 114 of the chassis frame 1a is another transverse member 118 which supports a bearing 119 for a nut sleeve 120 in engagement with a vertical screw spindle 20a. Integrally formed with the nut sleeve 120 is a worm wheel 121 arranged to be driven by a worm 122 affixed to a sleeve 123 which surrounds a portion of the shaft 27a and which extends with the latter into the transmission housing 19a. At its top end, the screw spindle 20a supports a cross bar 124 with pendant ears 125 carrying pins 9a which engage in slots 126 in the lower ends of the lifting bars 12a. The lower ends of the other lifting bars 11a are slotted as at 127 for sliding engagement with a fixed rod 10a extending crosswise between pendant ears 128 on the chassis frame 1a. Splined to the shaft 27a within the auxiliary transmission housing 19a is a sleeve 129 which carries a bevel gear 130; and splined to the sleeve 123 is a bevel gear 46a which is yieldingly maintained in contact with the contiguous end of the sleeve 129 by a compression spring 52a, said sleeve 129 being connected to the latch control handle 53a. Normally, the gears 130 and 46a occupy neutral positions at opposite sides of the bevel gear 45a on the inner end of the shaft 39a. By shifting the handle 53a to the right from the position shown in Fig. XI, both the gears 130 and 46a will be correspondingly moved, the first into mesh with the driving pinion 45a, and the other still farther away from said pinion 45a as permitted by the spring 52a. Under this condition, the shaft 27a and the worm 117 will be driven when the handle 43a is manipulated to actuate the arms 11a, 12a and thereby raise or lower the supplemental frame in accordance with the position of said handle. Upon shifting the handle 53a to the left from the position shown in Fig. XI, the bevel gear 46a will be meshed with the driving gear 45a and the gear 130 farther removed from said driving gear. Under this condition, the sleeve 123 will be driven alone and the screw spindle 20a rotated to effect tilting of the supplemental frame 3a as and for this purpose explained in connection with the first embodiment. All other elements not specifically mentioned in connection with the alternative form of truck in Fig. X, but having their counterparts in the first described form have been identified by the same reference numerals previously employed except for the use, in each instance, of the letter "a" for the purposes of distinction.

The modification illustrated in Fig. XIII is generally similar to the form shown in Figs. X, XI, XII except in that the ramp end 61b is somewhat more prolonged so as to reach substantially to the surface of the platform 110a for capacity to engage beneath the rollers 89b, 90b of a carriage secured to the bottom of the container 85b. Here again to preclude the necessity for duplicate description, all elements having their counterparts in the first embodiment have been identified with the same reference numerals but distinguished by the letter "b".

In Fig. XIV, I have illustrated a modified elevating and tilting transmission which may be employed in place of that shown in Figs. V, VI. Here two bevel gears 135 and 46c are loosely mounted on the shaft 27c and always in mesh with the driving gear 45c on the lateral shaft 39c. Splined to the shaft 27c between the gears 135 and 46c is a collar 136 with clutch teeth at opposite ends adapted to coact respectively with clutch teeth on said gears, when said collar is shifted one way or the other by means of the control handle 53c. Depending on the selection between the gears 135, 46c, the shaft 27c carrying the screw spindle 20c, and the screw spindle 18c can obviously be concurrently rotated to raise or lower the auxiliary frame of the truck. A collar 48c also splined on the shaft 27c and shiftable by a separate handle 137 is formed with a clutch head 50c to oppose the clutch head 51c on the inner end of the plain end of the screw spindle 18c. By this means, the screw spindle 18c can be disconnected from the shaft to permit operation of the screw spindle 20c alone in tilting the supplemental frame of the truck as in Fig. IV.

In Fig. XV there is illustrated another modified form of elevating and tilting transmission which can be substituted for that shown in Figs. X and XI. In this instance, the plain end of the screw spindle 18d extending into the transmission housing 19d has a clutch head 51d contiguous to a clutch head 50d on the shaft 27d, which, in this instance, terminates within said housing. Surrounding the clutch heads 50d, 51d is a hollow cylindric clutch member 138 with internal toothed faces at opposite ends to coact with the teeth of said clutch heads. As shown, the clutch member 138 is splined at 139 to the inner end of an auxiliary shaft section 140 axially aligned with the shaft 27d, said member being shiftable by means of the control handle 137d. Free on the shaft section 140 are the bevel gears 135d and 46d which are in constant mesh with the driving bevel gear 45d on the lateral shaft 39d. The selective clutching arrangement for the gears 135d and 46d is identical with that shown in Fig. XIV. Shifting of the clutch member 138 in one direction will, with this arrangement, obviously result in the positive connection of the shaft 27d with the auxiliary shaft section 140, and shifting of said member in the opposite direction will result in the connection of the sleeve 18d with said auxiliary shaft section 140 as required for the operation of the elevating and tilting mechanism in the form of truck shown in Fig. X.

Figs. XVI and XVII feature an alternative form of detaining means for the shipping containers in which the stop 102e is hingedly connected at 103e to the corresponding side longitudinal of the carriage 55e so that it can be swung laterally to the position shown in dot and dash lines in Fig. XVII. A removable pin 108e serves to lock the detaining means or keeper 102e in active position.

In Figs. XVIII and XIX there is illustrated another alternative type of detaining means adapted for association with the stop 101 for each front roller 89 of the container. Here the detaining means is in the form of a sector 102f which is fulcrumed to swing about a fixed axis 103f through a slot 141 in the side longitudinal of the carriage 55f. A torsion spring 142 yieldingly urges the sector 102f upward and maintains it behind the roller 89f on the container after said roller has entered the stop 101f. The swing of the sector 102f is limited by engagement of stop lugs 143, 144 thereon with the bottom surface of the carriage longitudinal. As the container is moved onto the carriage 55f, the sector 102f is displaced as it is passed over by the roller 89f in the manner shown in Fig. XIX, and when finally engaged in the stop 101f the sector is automatically raised to active position by the spring 142 as shown in Fig. XVIII. When the container is to be removed from the truck, the sector 102f can be withdrawn by means of an actuating rod 145 which may extend to the rear end of the carriage 55f. If desired, this type of detaining device can also be used for the rear rollers 90 of the container.

Referring now to Fig. XX, which illustrates the adaptation of this invention for lateral movement of the carriage 55 relative to the truck chassis frame 2, all parts having their equivalents in the description relating to Figs. I–IX being correspondingly designated with the exponent "g" in order to obviate duplicative description. In this form of the invention, however, the carriage 55g comprises parallel spaced transverse members 56g, cross braces 57g, and similarly spaced longitudinals 58g; said members having inclined approaches or ramps 61g; and the carriage 55g being provided with rollers 59g thereunder for coaction with transverse rails 146 rigidly secured to the supplemental frame 3g, for the purposes hereinbefore explained. In addition, the stops 101g and 102g are, in this form of the invention, mounted on the transverse members 56g, for obvious reasons. Furthermore, and in order to move the carriage 55g transversely of the supplemental frame 3g, the latter is provided with a lateral screw 147, conveniently journaled at one end in an outboard bearing 148, rigidly supported from the frame 3g by brace members 149; and at its other end by a bearing 150 forming part of a gear-box 151 also secured to the opposing side of the frame 3f. The plain end of the screw 147 engages the nut block 68g and projects into the bearing 150 at the outside of the gear-box 151, and it is fitted with a bevel gear 152 meshing with a similar gear 153 on the proximate extremity of a longitudinal shaft 154 journaled at that end in the gear-box 151, and at its other end in a gear-box 155, also secured to the frame 3g, where it is fitted with a bevel gear 156, meshing with a corresponding gear 157 on the end of a cross-shaft 158, journaled intermediate the gear-box 155 and the transmission housing 62g; and wherein it is connected by gears 159 to the drive spindle 63g for operation thereby, in the manner hereinbefore set forth. The container moving or hauling cable 91g, in this form of the invention is trained from the winding drum or winch 95g about suitably positioned idler sheaves 160, 161 and 162, journaled in guides 163 respectively attached to one of the winch bearing standards 97g, the gear box 155, and the gear box 151; and said cable is provided at its free end with a hook 92g for engagement with the container, as previously set forth. In all other respects this form of the invention corresponds with description relating to Figs. I–IX, inclusive, both as regards elevation and inclination of the supplemental frame 3g. Accordingly, further elaboration thereof is herein dispensed with.

From the foregoing it will be seen that I have devised a simple, compact and efficient mechanism for fulfilling the desired objects of this invention, and while there are illustrated embodiments of said invention now deemed preferable, I desire to secure and reserve the right to make such changes or modifications as may fairly fall within the scope of the following claims.

Having thus described my invention, I claim:

1. A motor truck comprising a chassis frame; a supplemental horizontal frame associated with the chassis frame; a pair of lazy-tong bars connecting the supplemental frame with the chassis frame; axially-aligned actuating screws with associated nut-blocks for the crossed bars; and sleeve means whereby said actuating screws can be concurrently operated to raise and lower the supplemental frame, or one of them operated alone to tilt said supplemental frame.

2. A motor truck as defined in claim 1, wherein the lazy-tong bars each have a pivotal connection at one end with the supplemental frame, and a sliding pivotal connection at the opposite end with the chassis frame; and axially-aligned screw means whereby the sliding pivotal connections may be concurrently shifted to raise and lower the supplemental frame, or one of them shifted alone to cause tilting of said supplemental frame.

3. A motor truck comprising a chassis frame; a supplemental horizontal frame associated with the chassis frame; a pair of lazy-tong bars each having a pivotal connection at one end with one of said frames, and a sliding pivotal connection at the other end with the other of said frames; separate actuating screw spindles coordinated with the respective sliding pivotal connections aforesaid; and means whereby said screw spindles may be concurrently rotated to effect raising and lowering of the supplemental frame, or one of said spindles rotated alone to effect tilting of the supplemental frame.

4. A motor truck comprising a chassis frame; a supplemental horizontal frame associated with the chassis frame; a pair of crossed pivotally-interconnected lazy-tong bars each having a pivotal connection at one end with one of said frames and a sliding pivotal connection at the other end with the other of said frames; means whereby the common pivotal connection between said lazy-tong bars may be shifted vertically to raise and lower the supplemental frame.

5. A motor truck comprising a chassis frame; a supplemental horizontal frame associated with the chassis frame; a pair of crossed, pivotally-interconnected lazy-tong bars each having a pivotal connection at one end with one of said frames and a sliding pivotal connection at the other end with the other of said frames; means for vertically shifting the common connection between the lazy-tong bars to raise and lower the supplemental frame; and means whereby one of the sliding pivotal connections of said bars may be shifted to tilt said supplemental frame.

6. A motor truck comprising a chassis frame, an associated horizontal supplemental frame, lazy tong mechanism whereby the supplemental frame can be raised and lowered and tilted relative to the chassis; a carriage supported on the supplemental frame, an actuating screw spindle for shifting the carriage back and forth longitudinally of the supplemental frame; and a nut block engaging the screw spindle to which the carriage is connected at its forward end with capacity for up-and-down pivotal movement independently of the supplemental frame.

7. A motor truck comprising a chassis frame, a supplemental horizontal frame associated with the chassis, lazy tong mechanism whereby the supplemental frame can be raised and lowered and tilted relative to the chassis, a carriage sustained by the supplemental frame with capacity for movement transversely relative to the chassis, an actuator screw for moving the carriage onto and off the supplemental frame laterally, and a nut block engaging the actuator screw to which the carriage is connected with capacity for up-and-down pivotal movement independently of the supplemental frame.

8. A motor truck comprising a chassis frame, a supplemental horizontal frame associated with the chassis, lazy tong mechanism whereby the supplemental frame can be raised and lowered and tilted relative to the chassis, a carriage sustained by said frame with capacity for movement transversely relative to the chassis, an actuator screw for moving the carriage onto and off the supplemental frame laterally, a nut block engaging the actuator screw to which the carriage is connected with capacity for up-and-down pivotal movement independently of the supplemental frame, and means operatively coordinating the actuator screw for operation by power derived from the truck motor.

9. The combination of claim 8, further characterized by cable means for shifting the carriage, and mechanism for operating the cable also deriving power from the truck motor.

10. In a motor truck for transporting railway freight containers comprising a chassis frame, a supplemental horizontal frame associated with the chassis frame, means whereby the supplemental frame can be raised to the level of loading platforms of different heights; a carriage on the supplemental frame having a ramp or wedge end, said ramp or wedge end being arranged to cooperate with rollers below the container bottom in lifting said containers; means for drawing the container into its final position on the carriage before the latter is returned; and stop means for cooperating with the rollers on the container to determine its final position on the carriage, and for locking it against shifting during transport.

11. A motor truck as defined in claim 10 wherein stop means cooperate with the front rollers on the container to determine its final rest position on the carriage; and means are arranged for cooperation with the rear rollers on said container to lock it against shifting during transport.

12. A motor truck as defined in claim 10 wherein lock means have capacity to yield to displacement upon being passed over by the rollers in loading, and to automatically move into locking position after passage of said rollers.

ROBERT FARIES.